No. 672,851. Patented Apr. 23, 1901.
H. A. SPILLER.
ELECTRICAL TRANSMISSION OF MOTION FOR STEERING SHIPS OR OTHER PURPOSES.
(Application filed Oct. 30, 1891.)
(No Model.)
4 Sheets—Sheet 3.

UNITED STATES PATENT OFFICE.

HARRY A. SPILLER, OF BOSTON, MASSACHUSETTS, ASSIGNOR, BY MESNE ASSIGNMENTS, TO THE GENERAL ELECTRIC COMPANY, OF SCHENECTADY, NEW YORK.

ELECTRICAL TRANSMISSION OF MOTION FOR STEERING SHIPS OR FOR OTHER PURPOSES.

SPECIFICATION forming part of Letters Patent No. 672,851, dated April 23, 1901.

Application filed October 30, 1891. Serial No. 410,390. (No model.)

*To all whom it may concern:*

Be it known that I, HARRY A. SPILLER, a citizen of the United States, residing at Boston, in the county of Suffolk and State of Massachusetts, have invented certain new and useful Improvements in Electrical Transmission of Motion for Steering Ships or for other Purposes; and I do hereby declare the following to be a full, clear, and exact description of the invention, such as will enable others skilled in the art to which it appertains to make and use the same.

My invention relates to the transmission of motion and is useful wherever it is desired to produce at any point whatever a movement equal to or otherwise corresponding with the movement of any body whatever—as, for example, an operating handle, wheel, or lever.

I have in this specification described my invention with particular reference to its application to the steering of ships, a purpose to which it is peculiarly well adapted; but nothing herein is to be taken as restricting the invention to such use or as preventing its application to any other purpose whatever.

It frequently happens in the arts that it is desired to cause a shaft, arm, or other body to move, often with the expenditure of some considerable power, in such a way as more or less accurately to reproduce the motion of a governing-handle, which handle is often located at some considerable distance. By my invention I am enabled to accomplish this result rapidly and positively without any mechanical connection between the operating and operated bodies. Further, I am able to so arrange the system that the operated body will not only respond at once to any movement of the operating-body, but will positively and instantly come to a stop upon reaching the position corresponding to the position of the operating-body. Further, I am able to cause the operated body to respond to control from either one of a plurality of selected points indifferently, and yet to so arrange things that no interference is caused by the presence of a plurality of operating-bodies, all capable of acting upon the same operated body.

Various other results of great utility are secured by my invention, which will be more particularly pointed out and described in the following description and in the claims hereto annexed.

In the particular application of my invention herein set forth I provide an operated shaft controlled by an electromotive device or electric motor connected thereto through suitable mechanical connections. This shaft carries or actuates a controlling device which is electrically connected to a second controlling device at the operating or directing point. Any motion of the operating handle or wheel causes current to flow in the motor and causes the operated shaft to turn. When the desired motion is accomplished, the controlling device attached to the operated shaft breaks the circuit of the motor and applies a break to the shaft, causing it to stop positively and instantaneously.

In the drawings attached to this specification, which represent an application of my invention to the steering of ships, Fig. 1ᵃ is a view of the reversing-switch.

Figure 1:
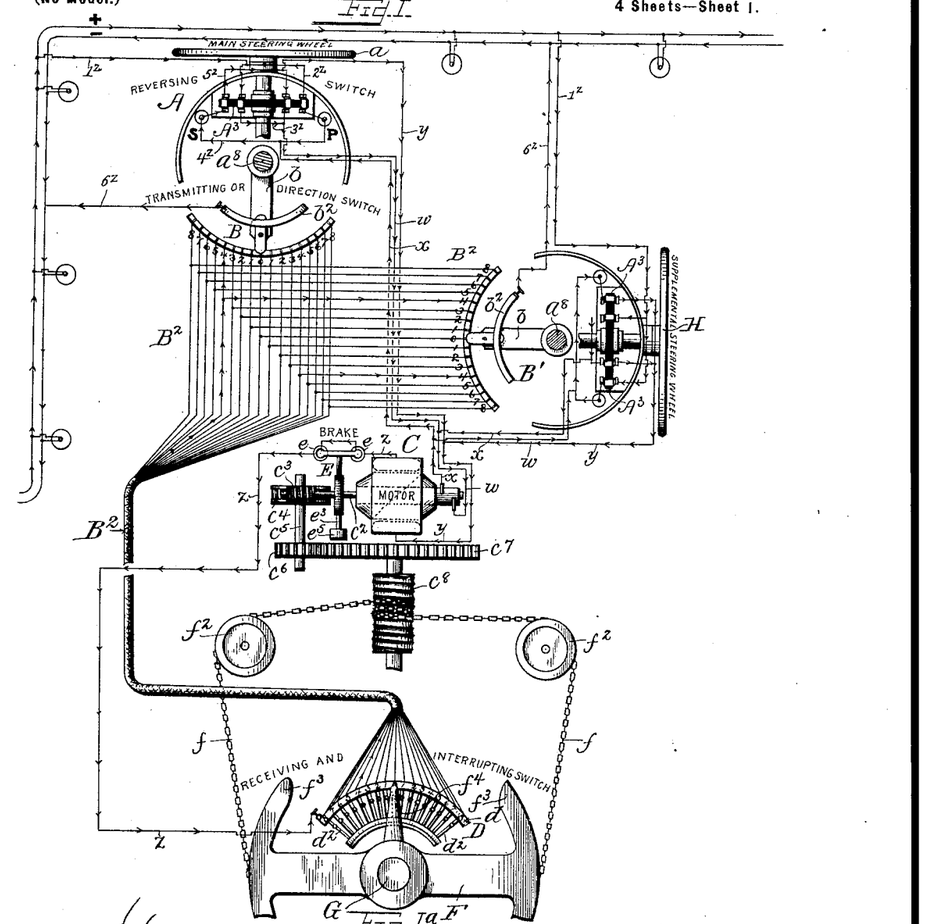
Figure 1 is a diagrammatic view of the system.

Referring to the drawings, more particularly to Fig. 1, G represents the shaft or body to be operated, C the electric motor or electrically-actuated device for operating said shaft or body, and $a$ the steering wheel or handle, constituting a controlling part or body, from which the movements of the shaft C is controlled.

The controlling device connected to the steering-wheel, which I have termed a "current-transmitter," comprises a reversing-switch A, for determining the direction of current-flow in the motor-circuits, and a controlling-switch B, which I have termed a "transmitting or direction switch," for determining the extent of movement of the body to which the said motor is connected.

The controlling device connected to the shaft or body to be operated comprises a switch mechanism adapted to open the circuit to the motor when the operated shaft or body reaches a position corresponding to the position of the controlling part and a device which I have termed a "circuit-breaker," connected to the shaft to be operated for actuating said switch mechanism. This controlling device I have termed a "receiving and interrupting switch" or a "combined current-receiver and circuit-interrupter."

The motor C is supplied with current through the current-transmitter, and the current-receiver and circuit-interrupter from the mains $+$ and $-$, which may be the lighting-mains of the ship.

H is an additional operating-wheel, which may be located in the captain's cabin or at any other preferred point. It controls a second current-transmitter, as will be more fully explained below.

Figure 2:
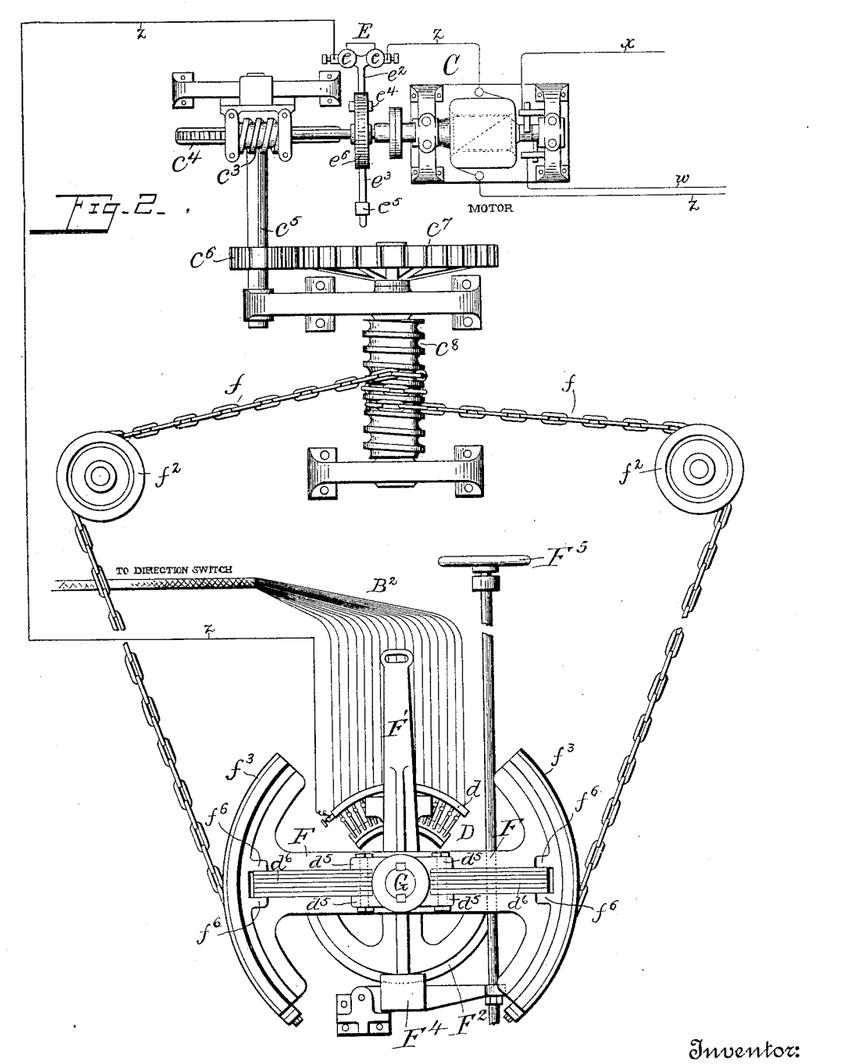
Fig. 2 is a view of the rudder-operating mechanism, or, speaking more broadly, of the controlled shaft and its driving mechanism.
Figure 5:
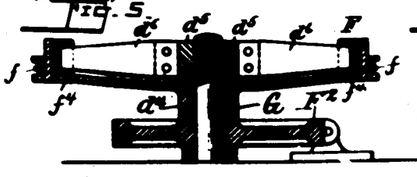
Fig. 5 is a view in longitudinal vertical section through the rudder-head.

Referring to Figs. 1, 2, and 5, the controlled shaft or body G, in this case a rudder-post, has keyed thereto a head or socket $d^5$, provided with projecting lugs or bosses, as shown, between which are bolted a number of flat steel bars or springs $d^6$. A sleeve $d^4$, which turns loosely on the shaft G, is provided with extensions F F, forming the tiller. These arms F F carry sectors $f^3 f^3$, ground to receive the chain $f$, and, further, are provided with projections $f^6 f^6$, into which are fitted the spring-bars $d^6$. This arrangement permits the rudder to be operated by the chains $ff$ with an elastic motion, such as to obviate shocks occasioned by the motion of the water.

Figure 7:
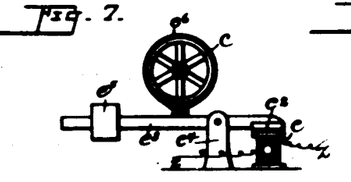
" Fig. 7 is a view of the device for positively arresting the motion of the operated shaft.

F' is a tiller by which the rudder may be worked by hand or otherwise in case of necessity. The sleeve $d^4$ also carries a sector $F^2$, which is adapted to engage with the friction-brake $F^4$, controlled by the hand-wheel $F^5$, as will be readily understood. This device is used to positively hold the rudder in any fixed position when desired, particularly in case of accident to the steering-gear. The chain $f$ is driven by a motor C through a worm $c^3$, work-wheel $c^4$, shaft $c^5$, pinion $c^6$, gear $c^7$, and drum $c^8$. The field-magnets of the motor are excited by the circuit which includes two coils $e$ $e$ of the friction-brake E. The brake is shown in detail in Fig. 7. The shaft of the motor C, which, as will readily be seen, is connected with and might be regarded as constituting the operated body, carries a wheel $c$, around which is wound a band $e^6$, connected to a lever $e^3$, pivoted in the standards $e^4$. A weight $e^5$, adjustable over the lever $e^3$, tends to keep the brake tight on the shaft at all times, and the coils $e$, acting on the armature $e^2$, act to loosen the brake when the field-magnets of the motor are excited.

Figure 6:
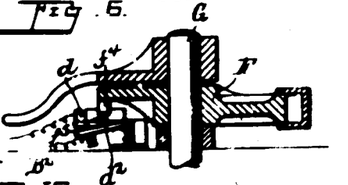
Fig. 6 is a transverse sectional view of the same, showing a portion of the controller attached to the operated shaft, which I call the "receiving and interrupting switch.

The shaft or operated body G carries an arm or circuit-breaker $f^4$, which operates to interrupt the motor-circuit at the receiving-switch D when the operated body reaches a position corresponding to the position of the operating or controlling body. The arrangement of the parts by means of which this result is accomplished is well shown in Figs. 6, 11, and 12. A number of contacts $d^2$ are each connected to one wire of the cable $B^2$ and are all normally in contact with the sector $d$. The arm $f^4$ acts, through the insulating-piece $f^5$, to break contact between $d$ and one of the contacts $d^2$, depending upon the position of the operated body or shaft G.

Figure 3:
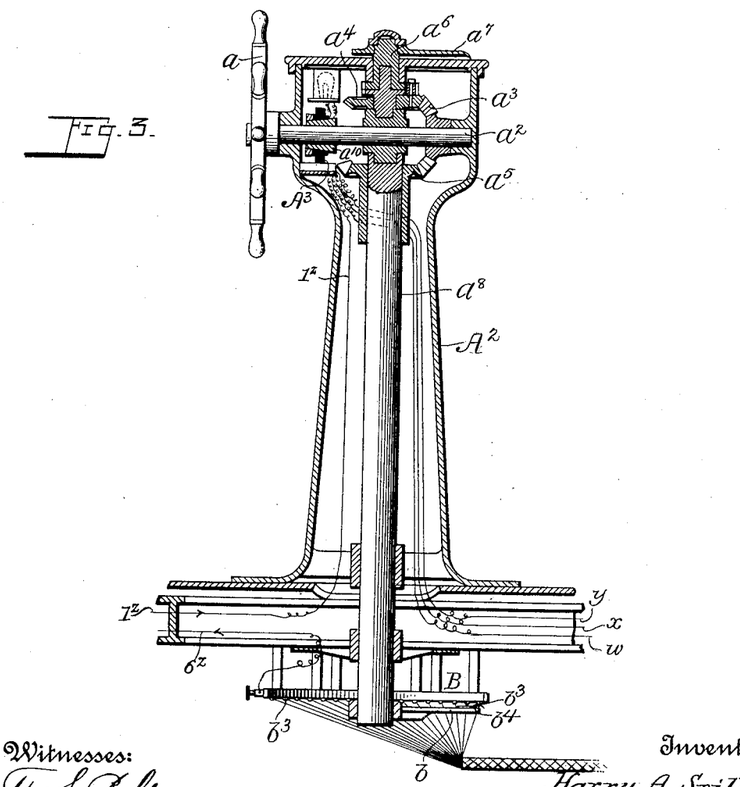
Fig. 3 is a sectional elevation of the operating-body or steering-wheel with the controller or direction-switch thereto attached.
Figure 4:
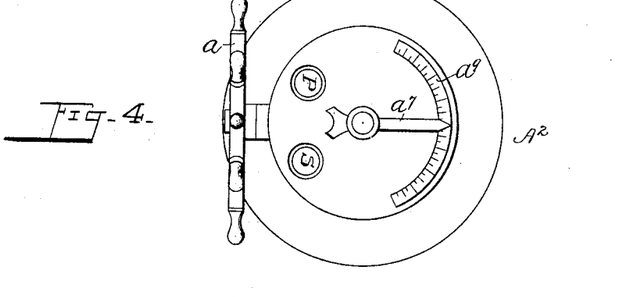
Fig. 4 is a plan of the same.
Figures 8, 9, 11, 12, 13:
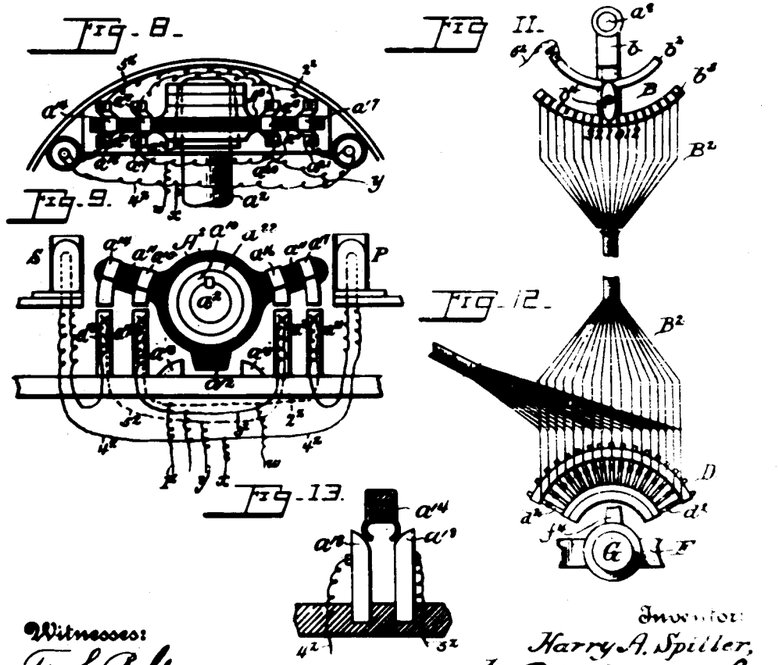
Figs. 8 and 9 are enlarged detail views, in plan and elevation, respectively, of the reversing-switch which I usually employ in connection with the direction-switch.
Fig. 11 is a view in plan of the direction-switch.
Fig. 12 is a similar view of the receiving and interrupting switch.
Fig. 13 is a detail view, on an enlarged scale, of the spring contact-arms of the reversing-switch.
Figure 10:
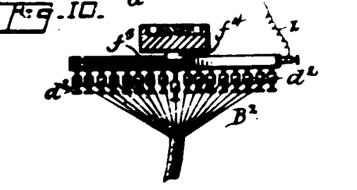
Fig. 10 is a view in elevation of a portion of the receiving and interrupting switch.

Referring now more particularly to Figs. 3 and 4, $a$ is the operating-handle or steering-wheel, connected to a shaft $a^2$, mounted in the casting $A^2$. The shaft carries a bevel-gear $a^3$, meshing with another bevel-gear $a^4$ and $a^5$. The gear $a^5$ drives a sleeve keyed to the shaft $a^8$. The gear $a^4$ drives, through a shaft $a^6$, the pointer $a^7$, working on a scale $a^9$, and thus indicates at all times the position of the operating mechanism and the position to which the operated mechanism either has come or is approaching. The shaft $a^2$ also carries a sleeve $a^{10}$, keyed thereto, as seen more in detail in Figs. 8 and 9. This sleeve, as appears from Fig. 3, is conical and carries a reversing-switch sleeve $A^3$, of insulating material, mounted on the metal sleeve $a^{22}$. This sleeve $a^{22}$ slips on the sleeve $a^{10}$ with frictional contact only. The sleeve $A^3$ carries two arms $a^{11} a^{11}$, provided with contacts $a^{14} a^{15} a^{16} a^{17}$, as shown best in Figs. 8 and 9. These contacts are adapted to bear upon stationary contacts $a^{18} a^{19} a^{20} a^{21}$, as shown in Fig. 13. Stops $a^{13} a^{13}$ engage with the projection $a^{12}$ on the sleeve $A^3$ to limit the movement of the reversing-switch. The result of any motion of the wheel $a$ is to move the circuit-closer $b^4$, carried by the arm $b$, Figs. 3 and 11, through the shaft $a^2$, gear $a^3$, gear $a^5$, and shaft $a^8$ over the contacts $b^3$. It will be seen that the circuit-closer $b^4$ always bridges from one of the contacts $b^3$ to the segment $b^2$, the particular contact being determined by the position of the operating-handle; but before any substantial movement of the arm $b$ can be accomplished the shaft $a^2$ acts to close the reversing-switch at the contacts $a^{14} a^{15} a^{18} a^{19}$ or at the contacts $a^{16} a^{17} a^{20} a^{21}$, according to the direction of the motion, and thus to determine the direction of the movement of the apparatus. The switch then slips on the shaft $a^2$, held by the projection $a^{12}$, and remains stationary until the wheel $a$ happens to be moved in the reverse direction.

Referring to Figs. 1 and 1ª and supposing the wheel to be moved in such a way that the contacts $a^{14}$ $a^{18}$ $a^{15}$ $a^{19}$ come into operation, it will be seen that current flows from the $+$ main, following the arrow through the wire $1^z$ to the wire $2^z$ and thence to the upper contact $a^{19}$, through the contact $a^{15}$ on the arm $a^{11}$, Fig. 9, to the lower contact $a^{19}$, and out to the wire $w$. Thence it passes through the armature of the motor C, Fig. 1, and returns through the wire $x$ to the signal-lamp S and to the lower contact $a^{18}$ through the contacts $a^{14}$ to the upper contact $a^{18}$ and thence through the wire $5^z$ to the wire $y$ and through the field-magnet of the motor C and the brake-coils $e$ $e$ to the sector $d$ of the receiving-switch. From $d$ it may return through any of the wires of the cable $B^2$ (see Figs. 1, 11, and 12) to any of the segments $b^3$ of the transmitting-switch, and does, in fact, return through that wire and segment corresponding to the position of the contact $b^4$ and operating-handle $a$ to the segment $b^2$, and, finally, to the $-$ main through the wire $6^z$. The lamp S lights to show the direction in which the motor is rotating. If, however, the wheel $a$ had been rotated in the reverse direction, current would have passed through the lamp P instead of the lamp S and out at the wire $x$, returning through the wire $w$, thus reversing the armature of the motor. The two lamps P and S, located adjacent to the controlling part or operating-body, constitute, therefore, an indicator for showing the direction of movement of the controlled part or operated body.

It will be seen that in whichever direction the wheel $a$ is turned there is formed one series circuit from the mains, including the reversing-switch, motor-armature, motor-fields, brake-coils, receiving-switch, one of the wires of the cable $B^2$, and the transmitting-switch. The order in which switches and translating devices are connected in a series circuit is, in general, immaterial, except that the contacts of the reversing-switch must bear the proper relation to that element of the motor which is to be reversed.

In the rest position of the apparatus no current flows, since the circuit is or may be open at two points. It may obviously be opened at the reversing-switch by giving the operating-handle a motion sufficient to bring the arm $a^{11}$ to the position shown in Fig. 9; but, aside from this, it is open at the receiving-switch, Figs. 1, 6, 10, and 12, whenever the arm $f^4$ occupies a position corresponding to that of the arm $b$, (see particularly Figs. 11 and 12,) in which current flowing to the segment $d$, Fig. 6, cannot return through the central wire of the cable $B^2$, since the corresponding contact $d^2$ is removed from the segment $d$; but it cannot return through any of the other wires, as they are out of contact with $b^4$, and thus with $b^2$. Therefore no current flows, the motor is idle, and the friction-brake E rigidly holds the operated shaft in the position shown.

The wheel or operating-handle H, Fig. 1, is provided with a second reversing-switch, connected to the mains as shown, and with a transmitting-switch, signal-lamps, &c., in all respects similar to those shown in Figs. 3, 4, &c. The segments of this transmitting-switch are connected to the cable $B^2$, just as are the segments of the first transmitting-switch, and the two pieces of apparatus are in all respects identical, electrically and mechanically.

Suppose that the apparatus is in the position shown in Fig. 1, with both reversing-switches in the position shown in Fig. 8. Suppose now that the wheel $a$ of the first controller A be turned until the arm $b$ rests in a position to connect the left-hand contact 4 of the transmitting-switch with the segment $b^2$. Current can now flow from the $+$ main in the path described above, following the arrows, as the same movement obviously closes the reversing-switch in the proper direction. The friction-brake will therefore be loosened and the motor will be energized to run in a direction such as to move the arm $f^4$ left-handedly. The proper lamp will glow to show that the apparatus is performing its functions. When the arm $f^4$ reaches the contact $d^2$, (marked 4 on the left,) it will interrupt the circuit, the motor will stop, the friction-brake will be applied, and the pilot-lamp will go out, showing that the rudder has reached the proper position. Any further movement of the wheel $a$ in the same direction will cause a similar action, while any motion in the opposite direction will throw the reversing-switch, after which the action will proceed as before, but in the reverse direction. Obviously, whenever the reversing-switch at A is open, which can be readily accomplished by a slight movement of the wheel $a$ in the direction opposite to that in which it was last thrown, the wheel H can take up the control.

I have thus provided an apparatus by which a controlled body may be caused to respond definitely and promptly to either one of a plurality of controlling or operating handles to come to the proper position and to be instantly stopped and rigidly held when it has reached that position. It has been proposed to call such an apparatus a "telemotor." Such term, though not coined by me, is fairly expressive of one aspect of my invention. Usually I prefer to cause the motor C to directly actuate the controlled body, as shown; but obviously various other arrangements are possible and clearly within the spirit and scope of my invention. For example, I may mention the apparatus described in the patent to John D. Williamson, Jr., No. 591,995, dated October 19, 1897, which illustrates one of the modifications of which my invention is capable.

My invention, except in its more specific aspect, is not limited to the particular applications shown in the drawings, and to those skilled in the art various other modifications and various useful purposes which may be subserved thereby will readily suggest themselves.

Having thus particularly illustrated and described one application of my invention and the best manner known to me of making and using the same in such a way that those skilled in the art will be able fully to understand it, I do not limit myself thereto, but claim as my invention and desire to secure by Letters Patent of the United States—

1. The combination with an electric motor, of a shaft mechanically connected thereto, a circuit-interrupting switch connected to said shaft, and means for determining the extent of movement of said motor and shaft from either one of a plurality of selected points, at will.

2. The combination of an operated shaft or body, with an electromotive device, a receiving-switch in operative connection with the operated body, and a plurality of controlling-switches located at different points, each of said controlling-switches having a plurality of operative positions corresponding to the positions into which it is desired to move the operated shaft or body, and each capable of taking up the control of said operated shaft or body.

3. In combination, a body to be moved, an electrically-actuated device for moving said body, a source of current-supply, a controlling-handle having a series of operative positions corresponding to the positions into which it is desired to move said body, a controlling-switch, for determining the extent of movement of the body to be moved, controlled by the movement of said controlling-handle, a circuit-interrupting switch operatively connected to the body to be moved, and circuits connecting said electrically-actuated device to said source through the contacts of said controlling and circuit-interrupting switches.

4. The combination with a shaft or body, of electrically-actuated means for moving said shaft or body, a controlling-switch, for determining the extent of movement of the body to be moved, in circuit with said electrically-actuated means, a handle, for operating said switch, indicating by its position the position to which the shaft or body is to be moved, and means for opening said circuit when the shaft or body has reached the desired position.

5. The combination with a shaft or body, of electrically-actuated means for moving said shaft or body, a controlling-switch, for determining the extent of movement of the body to be moved, in circuit with said electrically-actuated means, a handle, for operating said switch, having a plurality of operative positions corresponding to the positions into which the shaft or body is to be moved, and means for opening said circuit when the shaft or body has reached the desired position.

6. The combination with a shaft or body to be moved, of electrically-actuated means for moving said body, a controlling-switch, for determining the extent of movement of the body to be moved, in circuit with said electrically-actuated means, said switch having a plurality of operative positions, and means for opening said circuit when the body has been moved to a position corresponding to the position of said switch.

7. The combination with an operating shaft or body, of an electric motor, a controlling-switch, for determining the extent of movement of the body to be moved, in circuit with the said motor, a receiving-switch operatively connected to the operated body, electrical connections between the receiving-switch and the controlling-switch, circuits connecting the motor to a source of supply through the contacts of said receiving and controlling switches, and means for positively arresting the body when it has attained a position corresponding to that of the controlling-switch.

8. The combination of a wheel or handle, means controlled by said handle for passing current to an electric motor, a driven shaft at a distance from, and not mechanically connected to, the handle, and a receiving-switch in series with the motor constructed to interrupt the supply of current to the same when the driven shaft arrives at a position corresponding to that of the handle.

9. In a device for transmitting a determined movement, the combination with a driven shaft of an electric motor for driving said shaft, a controlling-switch for determining the extent of movement of the body to be moved, a receiving-switch attached to the driven shaft, a brake for said shaft, a coil for withdrawing the brake, a source of electricity and circuit connections between said source and said motor through the controlling-switch, the receiving-switch and the withdrawal-coil on the brake.

10. The combination with an electric motor, of a receiving-switch movable responsively to movement of said motor, a controlling-switch for determining the extent of movement of the motor, electrical connections between the receiving-switch and controlling-switch, circuits connecting the motor to a source of supply through said receiving and controlling switches, and automatically-controlled means for arresting the motion of said motor when the supply of energy thereto is interrupted.

11. The combination with a controller, of a motor in series with a source of supply through the controller, and a switch mechanism in series with the controller and motor, and mechanically connected to said motor, but not mechanically connected to the controller, adapted to open-circuit the motor when it reaches a position corresponding to that of the controller.

12. The combination with a controller, of a motor in series with a source of supply through the controller, and a switch mechanism in series with the controller and motor, and mechanically connected to said motor, but not mechanically connected to the controller, adapted to open-circuit the motor when it reaches a position corresponding to that of the controller, and a friction-brake controlled by a coil in series with the motor and the said controller and switch.

13. The combination of an electromotive device, a source of supply, a controlling-switch, for determining the extent of movement of the electromotive device, connected in circuit between said source and said device, a receiving-switch movable responsively to movement of said electromotive device and acting to interrupt the supply of working current thereto when the positions of the controlling and receiving switches correspond, and means for positively arresting the movement of said motive device when the supply of energy is interrupted.

14. The combination of an electromotive device, a source of supply, a controlling-switch, having a plurality of operative positions, said switch being included in circuit between the electromotive device and the source of supply, a receiving-switch included in the same circuit, said switch having a movement corresponding to the movement of said electromotive device and acting to cause an interruption in the supply of working current thereto when said device has been moved into a position corresponding to the position of the controlling-switch.

15. The combination of an electromotive device, a source of supply, a plurality of controlling-switches by the operation of any one of which working current may be supplied to said motive device, and a receiving-switch in operative relation to said electromotive device and acting to cause an interruption in the supply of working current thereto when said device has been moved into a position corresponding to the position of the controlling-switch.

16. The combination of an electromotive device, a source of supply, a plurality of controlling-switches, each having a plurality of operative positions, for determining the extent of movement of said device and by the operation of any one of which the electromotive device may be supplied with working current from said source of supply, and a receiving-switch controlled by the movement of said electromotive device and acting to cause an interruption in the supply of working current when the device has moved to the desired position.

17. In a device for transmitting motion, the combination with a controlling part, a controlled part, and means for causing the controlled part to move in accordance with the movement of the controlling part, of an indicator comprising a plurality of indicating devices, means for energizing one or the other of said devices according to the direction of movement of the controlled part, and means operated by the latter for stopping the indication when the controlled part ceases to move.

18. In a steering-gear, the combination with the wheel and the rudder, and means controlled by the wheel for operating the rudder, of a plurality of indicating devices at the wheel or adjacent thereto, means for energizing one or the other of said devices according to the direction of motion of the rudder, and means for stopping the indication when the rudder ceases to move.

19. In an electric steering-gear, the combination with the rudder and wheel and means controlled by the wheel for moving the rudder, of a suitable indicator adjacent to the wheel and in circuit with the rudder-controlling means, arranged to show the direction of motion of the rudder, but inoperative when the rudder is stationary.

20. The combination in an electric steering-gear, of a wheel and rudder, means controlled by the wheel for moving the rudder, and a lamp or lamps in circuit with the rudder-controlling means and indicating the direction of motion of the rudder, with means operated by the rudder for extinguishing the lamp when the rudder ceases to move.

21. In an electric steering-gear, the combination of a wheel and rudder and means controlled by the wheel for moving the rudder in either direction at will, of two lamps constituting an indicator, one of the lamps indicating the movement of the rudder in one direction, and the other indicating its movement in the other direction, means for closing the circuit to the rudder-controlling means through either of said lamps, and means controlled by the rudder for extinguishing the lamp which is in circuit when the rudder ceases to move.

22. In an electrotelemotor, for transmitting power intermittently, the combination of a current-transmitter provided with numerous contacts for regulating the extent of movement of the object to be moved, within such object's extreme limit of movement; a combined current-receiver and circuit-interrupter provided with contacts electrically connected with the contacts on said transmitter; and an electric motor electrically connected with said receiver and interrupter.

23. In an electric telemotor, the combination of a current-transmitter provided with numerous contacts for regulating the extent of movement of the object to be moved; a combined current-receiver and circuit-interrupter electrically connected with the contacts on said transmitter; an electric motor electrically connected to said receiver; means for automatically diverting the current from said motor; and means for arresting the momentum of the motor after such diversion.

24. Mechanism for controlling the movements of the tiller of a vessel, consisting of an electromotive device for supplying power thereto, in combination with switching mechanism for regulating the direction of such motion, a cut-out device mechanically operated by the tiller, and a brake controlled by the cut-out, substantially as described.

25. An electrically-controlled steering apparatus, comprising a controlling device for determining the extent of movement of the tiller, a motor, an electromagnetic brake in circuit with the motor, making-and-breaking devices controlled by the tiller, electrical connections between the controlling and making-and-breaking devices, and circuits connecting the motor to a source of supply through the controlling and making-and-breaking devices, whereby the tiller is maintained always in a fixed position corresponding to that of the controlling device, substantially as described.

26. An electrically-controlled steering-gear consisting of an electromotive device in circuit with a source of electrical energy, mechanism operated by the electromotive device for moving the tiller, a controlling device, for determining the extent of movement of the tiller, in circuit with said electromotive device, and a circuit-opening switch operatively connected to the tiller, said switch being connected in circuit with the said controlling and electromotive devices, substantially as described.

27. An electrical steering apparatus comprising the following elements: a motor, a current-reversing switch in circuit therewith, a receiving and interrupting switch adapted to be operated through mechanism actuated by the movement of the rudder, a transmitting or direction switch in circuit with said motor, and means for operating said latter switch to close a circuit from the supply-mains through the motor, the reversing-switch and the receiving and interrupting switch.

28. An electrically-operated steering mechanism comprising a current-transmitter provided with contacts, a combined current-receiver and circuit-interrupter provided with contacts electrically connected with the corresponding contacts on the said transmitter, and a motor electrically connected with a source of supply through the contacts of the transmitter and the receiver and interrupter, substantially as described.

29. An electrically-operated steering mechanism comprising a current-transmitter provided with contacts, a combined current-receiver and circuit-interrupter provided with contacts electrically connected with the contacts on said transmitter, and a motor electrically connected with said receiver and interrupter, all of said parts being on the same circuit and arranged and connected so that the circuit is automatically broken by said interrupter, substantially as described.

30. An electrically-operated steering mechanism comprising a current-transmitter provided with contacts, a combined current-receiver and circuit-interrupter provided with contacts, electrical connections between the corresponding contacts on said transmitter and said receiver and interrupter, a motor electrically connected with the said receiver and interrupter, and mechanism operated by the motor for moving the rudder, substantially as described.

31. An electrically-operated steering mechanism comprising a current-transmitter provided with contacts, a combined current-receiver and circuit-interrupter electrically connected with the contacts on said transmitter, and provided with circuit-interrupting contacts connected with a return, a motor in circuit with said receiver and interrupter, and means for mechanically operating said interrupter to cause its said contacts to interrupt the circuit to the motor, substantially as described.

32. An electrically-operated steering mechanism comprising an electric generator, a current-transmitter consisting of two switches mechanically and simultaneously operated by a single movement, a combined current-receiver and circuit-interrupter included in circuit in series with both switches of the transmitter, and a motor in circuit with the receiver and interrupter, substantially as described.

33. An electrically-operated steering mechanism comprising an electric generator, a current-transmitter having a switchboard provided with contacts, a movable arm carrying a circuit-closer traversing the said contacts, a current-receiver having a series of contacts, said latter contacts being electrically connected with the contacts on the transmitter, an arm traversing the current-receiver and operating to open the circuit at said receiver, and a motor electrically connected with the receiver, substantially as described.

34. In an electric steering-gear, the combination of the following-named elements: a current-transmitter provided with contacts, a combined current-receiver and circuit-interrupter also provided with contacts, electrical connections between the corresponding contacts of said transmitter and receiver and interrupter, a motor in circuit with said receiver and interrupter, an electromagnet, and means controlled by said magnet for automatically arresting the momentum of the motor, substantially as described.

35. In an electric steering-gear, the combination of the following-named elements: a current-transmitter provided with contacts, a combined current-receiver and circuit-interrupter also provided with contacts, electrical connections joining the corresponding contacts of said transmitter and receiver and interrupter, a motor in circuit with said receiver and interrupter, an electromagnet, and a brake to arrest the momentum of the motor, substantially as described.

36. In an electromechanical steering-gear, a wheel-post, a shaft journaled therein, a dial and an index-finger on the wheel-post, a steering-wheel for operating the shaft and the finger, a controlling-switch comprising a circuit-closer operated by the steering-wheel and traversing the contacts of said switch, a rudder-post carrying a circuit-breaker, a receiving and interrupting switch arranged in the path of travel of the circuit-breaker, a motor in circuit with the receiving and interrupting switch, and circuits connecting the controlling-switch, receiving and interrupting switch, and the motor, substantially as described.

37. In an electromechanical steering-gear, a wheel-post, a shaft journaled therein, a dial and an index-finger on the wheel-post, a steering-wheel for operating the shaft and the finger, a reversing-switch in the post, lamps in circuit with the switch, and corresponding in color to the port and the starboard lights of the vessel, a direction-switch comprising a circuit-maker operated by the steering-wheel, and traversing the contacts of said switch, a circuit-breaker operated by the rudder, a receiving and interrupting switch arranged in the path of travel of the circuit-breaker, a motor in circuit with the receiving and interrupting switch, and circuits connecting the direction-switch, receiving and interrupting switch, and the reversing-switch, substantially as described.

38. In an electromechanical steering-gear, a wheel-post provided with a dial, an index-finger and a steering-wheel, a reversing-switch and suitably-colored lamps in circuit therewith, a direction-switch located contiguous to the post, a shaft actuated by the steering-wheel and carrying a circuit-closer constituting one of the members of said direction-switch, a circuit-breaker operated by the rudder, a receiving and interrupting switch arranged in the path of travel of the circuit-breaker, a motor in circuit with the receiving and interrupting switch, circuits connecting the different switches and the receiving and interrupting switch with the motor, and an automatic brake for stopping the motor.

39. An electric steering-gear comprising a source of electrical energy, a reversing-switch and an indicator therefor, a steering-wheel operating the switch and the indicator, a transmitting-switch, a receiving and interrupting switch, circuit connections between the transmitting-switch and the receiving and interrupting switch, and a motor in circuit with the receiving and interrupting switch substantially as described.

40. An electrical steering-gear comprising a rudder, a motor connected therewith by interposed mechanism, a reversing-switch in circuit with the motor, a circuit-interrupting switch in circuit with the motor and mechanically connected to the rudder, a steering-wheel for operating the reversing-switch, and a brake for stopping the motor, substantially as described.

41. An electrical steering-gear comprising a rudder, a motor connected therewith by interposed mechanism, a reversing-switch in circuit with the motor, a circuit-interrupting switch in circuit with the motor and mechanically operated by the rudder, a steering-wheel for operating the reversing-switch, and a brake operated by the circuit-interrupting switch, substantially as described.

42. An electrical steering-gear comprising a rudder, a motor connected therewith by interposed mechanism, a reversing-switch in circuit with the motor, a circuit-interrupting switch in circuit with the motor and mechanically operated by the rudder, a steering-wheel for operating the reversing-switch, and an automatic brake for stopping the motor, substantially as described.

43. An electrical steering-gear comprising a rudder, a motor connected therewith by interposed mechanism, a reversing-switch in circuit with the motor, a circuit-interrupting switch in circuit with the motor and mechanically operated by the rudder, a steering-wheel for operating the reversing-switch, and an automatic brake operated by the circuit-interrupting switch, substantially as described.

44. In apparatus for the electrical transmission of power, the combination with an object to be moved, and a cut-out mechanically connected to such object, of a switch adapted, by being moved in opposite directions, to change the direction of travel of such object, an electromotive device in circuit with the switch and the cut-out device, and means for locking the object to be moved against travel when a predetermined point has been reached.

45. In combination, a shaft, a switch having one of its members rigidly connected to said shaft so that it may have a movement corresponding to the movement thereof, and a second switch having one of its members yieldably mounted on said shaft so that it may be thrown into one of its operative positions by the movement of the shaft in either direction.

46. In combination, an operated shaft or body, an electrically-actuated device for operating said body, a controlling shaft or body for determining the extent of movement of said body to be operated, a controlling-switch connected to said controlling-body, and having a movement corresponding to the movement of said body, and a reversing-switch yieldably connected to said controlling-body.

47. In an electric steering device, a motor in operative connection with the rudder, a source of electrical energy included in a circuit with the motor, a reversing-switch in said circuit, and a second switch in the circuit mechanically operated by the rudder, whereby the movement of the rudder serves to automatically open said switch, substantially as described.

48. In an electrical steering device, a motor in operative connection with the rudder, a source of electrical energy included in a circuit with the motor, a reversing-switch in said circuit, a second switch located adjacent to the rudder and included in said circuit, and means carried by the rudder-head for mechanically actuating said switch, whereby the movement of the rudder serves to automatically open said switch, substantially as described.

49. In an electrical steering device, a motor in operative connection with the rudder, a source of electrical energy included in a circuit with the motor, a reversing-switch in said circuit, a second switch located adjacent to the rudder and included in said circuit, and means carried by the rudder-head for mechanically disengaging the members of said switch, whereby the movement of the rudder serves to automatically open said switch, substantially as described.

In testimony whereof I affix my signature in presence of two witnesses.

HARRY A. SPILLER.

Witnesses:
DAVID H. MEAD,
F. B. KEEFER.